(12) United States Patent
Han

(10) Patent No.: US 9,372,795 B2
(45) Date of Patent: Jun. 21, 2016

(54) APPARATUS AND METHOD FOR MAINTAINING CACHE COHERENCY, AND MULTIPROCESSOR APPARATUS USING THE METHOD

(71) Applicant: Electronics and Telecommunications Research Institute, Daejeon (KR)

(72) Inventor: Jin Ho Han, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 302 days.

(21) Appl. No.: 14/030,543

(22) Filed: Sep. 18, 2013

(65) Prior Publication Data
US 2014/0082300 A1    Mar. 20, 2014

(30) Foreign Application Priority Data
Sep. 20, 2012   (KR) .................. 10-2012-0104316

(51) Int. Cl.
*G06F 12/08*   (2016.01)

(52) U.S. Cl.
CPC ........ *G06F 12/0815* (2013.01); *G06F 12/0831* (2013.01)

(58) Field of Classification Search
None
See application file for complete search history.

(56) References Cited

U.S. PATENT DOCUMENTS

| | | | |
|---|---|---|---|
| 6,694,409 B2 | 2/2004 | Chang | |
| 6,868,481 B1* | 3/2005 | Gaither | G06G 12/0822 711/119 |
| 8,185,695 B2 | 5/2012 | Conway et al. | |
| 2006/0174069 A1 | 8/2006 | Shaw et al. | |
| 2009/0083488 A1 | 3/2009 | Madriles Gimeno et al. | |
| 2009/0210628 A1* | 8/2009 | Gaither | G06F 12/128 711/134 |
| 2012/0137079 A1 | 5/2012 | Ueda | |

* cited by examiner

*Primary Examiner* — Daniel Tsui
(74) *Attorney, Agent, or Firm* — Kile Park Reed & Houtteman PLLC

(57) ABSTRACT

Provided are an apparatus and method for maintaining cache coherency, and a multiprocessor apparatus using the method. The multiprocessor apparatus includes a main memory, a plurality of processors, a plurality of cache memories that are connected to each of the plurality of processors, a memory bus that is connected to the plurality of cache memories and the main memory, and a coherency bus that is connected to the plurality of cache memories to transmit coherency related information between caches. Accordingly, a bandwidth shortage phenomenon may be reduced in an on-chip communication structure, which occurs when using a communication structure between a memory and a cache, and communication for coherency between caches may be simplified.

6 Claims, 3 Drawing Sheets

APPARATUS AND METHOD FOR MAINTAINING CACHE COHERENCY, AND MULTIPROCESSOR APPARATUS USING THE METHOD

CLAIM OF PRIORITY

This application claims priority to Korean Patent Application No. 10-2012-0104316 filed on Sep. 20, 2012 in the Korean Intellectual Property Office (KIPO), the entire contents of which are hereby incorporated by reference.

BACKGROUND

1. Technical Field

Example embodiments of the present invention relate in general to technologies for maintaining cache coherency and more specifically to a method for maintaining coherency between caches in a multiprocessor apparatus and an apparatus for maintaining cache coherency using the method.

2. Related Art

In general, a computer system includes three basic blocks such as a central processing unit (CPU), a memory, and an input/output (I/O) unit. These blocks are mutually connected through a bus, and input devices such as a keyboard, a mouse, and the like are used to input instructions or data through the I/O unit. The instructions and data may be stored in the memory, and the CPU may read the data stored in the memory and process the data in accordance with the stored instructions. The processed results may be stored again in the memory or output to an output device such as a printer through the I/O unit.

In particular, in recent days, computer systems utilizing multiple processors have been widely used, and in such a computer system, several tasks and functions are not processed only by a single CPU, and therefore the overall computing ability of the system may be improved.

In theory, a computer system having n processors should process an amount of work n times larger than that of a single processor, and therefore should have a speed n times faster than that of the single processor. However, in order to use multiple processors, a position of the most recent version of data is required to be known and such information is required to be known by each processor when data is needed to perform any operation, which is called data coherency.

The multiple processors have dedicated memories each usually referred to as a cache or a cache memory. The cache is used to increase the speed of an operation. In case of a processor having a cache, when any information is read by a main memory to be used by the processor, corresponding information and its main memory address are also stored in the cache memory.

The cache memory is a typically a static random access memory (SRAM). When a new read or write instruction is issued, a system may determine whether corresponding information exists in a cache memory. When the corresponding information exists in the cache memory, it is called that there is 'hit' (that is, the corresponding information can be utilized in a cache). Then, the corresponding information may be accessed from the cache rather than a main memory, and connection to the main memory is not required. When the corresponding information does not exist in the cache memory, new data is copied from the main memory to be stored in the cache memory for the future.

In case of a system employing, especially, multiple cache memories, data from a given memory position may simultaneously exist in the main memory and at least one cache memory. However, data in the main memory and data in the cache memory are not always the same. This case may occur when a processor updates data stored in the related cache memory without updating the main memory or another cache memory, or when another bus master changes data in the main memory without updating its copy from a processor cache memory. The bus master is the other device that can write or read instructions in a main memory.

In this manner, in the multiple cache system, in order to overcome problems which may occur when contents of a single cache memory and contents of a main memory for all caches are not identical to each other, a cache coherency protocol has been suggested.

The cache coherency protocol may be a method in which caches, processors, a main memory, and alternate bus masters perform communications with each other. The cache coherency protocol may ensure agreement maintenance between data stored in a main memory of a computer system and data stored in a cache formed on the same bus. In other words, the cache coherency protocol may be a protocol that is used by a computer system so as to trace data moving among processors, a main memory, and different cache memories.

Even in general methods that maintain coherency between caches using such a cache coherency protocol, a multiprocessor system has a limited main memory bandwidth, so that various problems may occur such as occurrence of a bottleneck phenomenon, and the like.

Therefore, there is a demand for a method for more effectively maintaining cache coherency.

SUMMARY

Accordingly, example embodiments of the present invention are provided to substantially obviate one or more problems due to limitations and disadvantages of the related art.

Example embodiments of the present invention provide a multiprocessor apparatus in which coherency between caches is maintained.

Example embodiments of the present invention also provide an apparatus for maintaining cache coherency.

Example embodiments of the present invention also provide a method of maintaining cache coherency.

In some example embodiments, a multiprocessor apparatus includes: a main memory; a plurality of processors; a plurality of cache memories that are connected to each of the plurality of processors; a memory bus that is connected to the plurality of cache memories and the main memory; and a coherency bus that is connected to the plurality of cache memories to transmit coherency related information between caches.

Here, the coherency bus may include a coherency bus arbiter (referred to as "cobus arbiter") that receives a coherency bus occupation request signal from the plurality of cache memories, permits occupation to a first cache memory, and controls transmission and reception of information signals between the plurality of cache memories.

Also, the cobus arbiter may receive a signal from the first cache memory, and transmits a coherency bus selection signal and the signal from the first cache memory to at least one second cache memories requiring an operation in association with a corresponding signal.

Also, the cache memory may include a cache coherency interface for exchanging signals for maintaining coherency with other cache memories.

Also, the cache coherency interface may exchange coherency related information signals with at least one another cache memory connected to the coherency bus using at least one of a coherency bus request signal, a coherency bus occupation permission signal, a main memory read attempting signal, a processor write signal, a coherency bus sharing signal, and a coherency bus invalidation signal.

Also, a state of the cache memory may be managed using a plurality of modes including an exclusive mode, a shared mode, an invalid mode, and a modified mode.

In other example embodiments, an apparatus for maintaining cache coherency includes: a coherency bus including a cobus arbiter that is connected to a plurality of cache memories for a plurality of processors and controls coherency bus occupation between the plurality of cache memories, wherein the cache memory includes a cache coherency interface so as to exchange signals for maintaining coherency with other cache memories.

Here, the cache coherency interface may exchange coherency related information signals with at least one another cache memory connected to the coherency bus using at least one of a coherency bus request signal, a coherency bus occupation permission signal, a main memory read attempting signal, a processor write signal, a coherency bus sharing signal, and a coherency bus invalidation signal.

In still other example embodiments, a method of maintaining coherency with other plurality of caches through a coherency bus connected to the other plurality of caches includes: determining to hold data corresponding to an address requested from a processor; generating a coherency bus request signal on the coherency bus when the data corresponding to the requested address is not held; generating information associated with the requested address and a main memory read attempting signal on the coherency bus when receiving a coherency bus occupation permission signal; and setting a cache state in accordance with a value of a signal received from the other plurality of caches.

Here, the information associated with the requested address may include a tag and an index value which are calculated as the address.

Also, a state of the cache memory may be managed using a plurality of modes including an exclusive mode, a shared mode, an invalid mode, and a modified mode.

Also, the setting of the cache state in accordance with the value of the signal received from the other plurality of caches may include setting its own state value as 'exclusive' when coherency bus sharing values received from the other plurality of caches are all '0', and setting its own state value as 'shared' when at least one of the coherency bus sharing values received from the other plurality of caches is '1.'

Also, the cache memory may exchange coherency related information signals with at least one another cache memory connected to the coherency bus using at least one of a coherency bus request signal, a coherency bus occupation permission signal, a main memory read attempting signal, a processor write signal, a coherency bus sharing signal, and a coherency bus invalidation signal.

Also, the method may further include changing, when data corresponding to a specific tag and index is changed by the processor, a state of the data corresponding to the tag and index as 'modified.'

Also, the method may further include changing, when holding data corresponding to an index and a tag with respect to a write signal of the coherency bus, a state of the data corresponding to the index and the tag as 'invalid.'

Also, the method may further include changing, when another cache sharing corresponding data is flushed while the held data is shared, a state of the corresponding data as 'exclusive.'

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
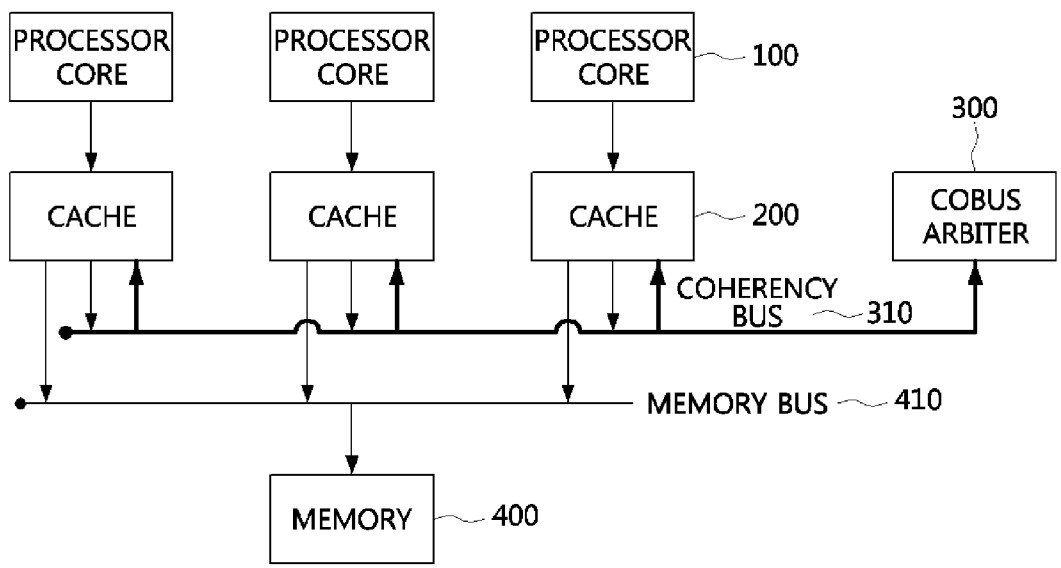
FIG. 1 is a block diagram showing a computer system having a multiprocessor according to an embodiment of the present invention.

Example embodiments of the present invention are disclosed herein. However, specific structural and functional details disclosed herein are merely representative for purposes of describing example embodiments of the present invention, and example embodiments of the present invention may be embodied in many alternate forms and should not be construed as being limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises", "comprising,", "includes," and/or "including", when used herein, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the present invention, a method of solving an incoherency problem of instructions and data in a cache which may occur by arranging a large number of cache memories when a plurality of processors read a program from the same memory within a chip is disclosed.

With reference to the appended drawings, exemplary embodiments of the present invention will be described in detail below. To aid in understanding the present invention, like numbers refer to like elements throughout the description of the figures, and the description of the same elements will be not reiterated.

FIG. 1 is a block diagram showing a computer system having a multiprocessor according to an embodiment of the present invention.

As shown in FIG. 1, a multiprocessor apparatus according to an embodiment of the present invention may include a main memory 400, a plurality of processors 100, a plurality of cache memories 200 which are connected to each processor, a memory bus 410 which is connected to the plurality of cache memories and the main memory, and a coherency bus 310 that is connected to the plurality of cache memories to transmit coherency related information between caches.

That is, according to an embodiment of the present invention, a multiprocessor computer system including a plurality of processor cores 100 and a plurality of caches 200 for each processor can be assumed. The caches are connected to each other through the memory bus 410, and at the same time, through the coherency bus 310.

The coherency bus 310 may include a coherency bus arbiter (referred to as "cobus arbiter") for controlling coherency bus occupation between the plurality of cache memories.

The processor is a device that reads an instruction stored in an external storage device to analyze the instruction, performs a specific operation using an operand designated by the instruction to store in the external storage device again, and performs a specific function by a stored program.

The processor may basically include a processor core and a cache memory. An operation to be performed by the processor is defined as a combination of a large number of instructions. That is, instructions are stored in a memory and sequentially input to the processor, so that the processor performs a specific operation every clock cycle. Since each processor should include a single cache, caches should be accordingly included when a large number of processors are mounted as shown in FIG. 1, and coherency maintenance between caches is also required.

The cache may increase the speed of the processor by momentarily storing instructions stored in an external memory in a chip.

In order for the processor core 100 to read data from the external memory, a significant amount of time of 10 to 100 cycles is consumed, which becomes a factor in which the core stays in an idle state for a long time.

The cache 200 is a unit for storing an instruction to be used by the processor core in a memory within a chip directly connected to the processor core, and momentarily stores an external large-capacity memory in the chip. Accordingly, the cache may significantly affect performance of the processor. In a case in which a processor core requests a specific instruction, when a corresponding instruction requested from the processor core does not exist in a cache, the corresponding instruction is required to be read from an external memory, and therefore the cache stays in an idle state while the corresponding data is read from the external memory. The processor transmits an address to the cache in response to every request, and the cache stores, in a tag memory, an address corresponding to an index with respect to an instruction code stored therein, that is, a tag, and then accesses the tag memory so as to compare the address and the tag in response to every instruction code request of the processor. In addition, a tag corresponding to the stored instruction code should be stored.

In addition, a cache memory exits for each processor when a plurality of processors are integrated, and when a tag is stored in the cache memory, it is necessary to know whether the corresponding tag is stored in another cache. This is because, in a case in which a processor performs a write operation in a tag stored in the other cache, the processor should read a write value from the other cache to the corresponding tag when reading the corresponding tag from the cache. That is, it is necessary to maintain coherency between caches.

As shown in FIG. 1, in the present invention, a storage space such as a directory is not positioned at a center. A method of maintaining cache coherency based on a directory generally has a long delay time, but a message is transmitted in a point-to-point method different from a broadcast method to cause less bandwidth to be consumed, and therefore the method may be mainly used in a large system having a large number of processors (larger than 64 processors).

In the present invention, the storage space such as the directory is not positioned at the center, and therefore a concentration phenomenon of communication that may occur when using the method of maintaining coherency based on the directory.

Specifically, in the present invention, cache coherency may be maintained using the following four modes.

Invalid: corresponding tag is invalid, so that corresponding tag should be read from memory again when request from processor is made Exclusive: when corresponding tag is read from memory, corresponding tag does not exist in another cache Shared: when corresponding tag is read from memory, corresponding tag exists in another cache, but is not changed to new value by processor in the other cache Modified: corresponding tag is read from memory, and changed to new value by processor In this manner, when performing communication between caches using the four modes, coherency may be maintained. For this, a cache should include an interface for cache coherency besides a communication interface between a processor and a memory.

Figure 2:
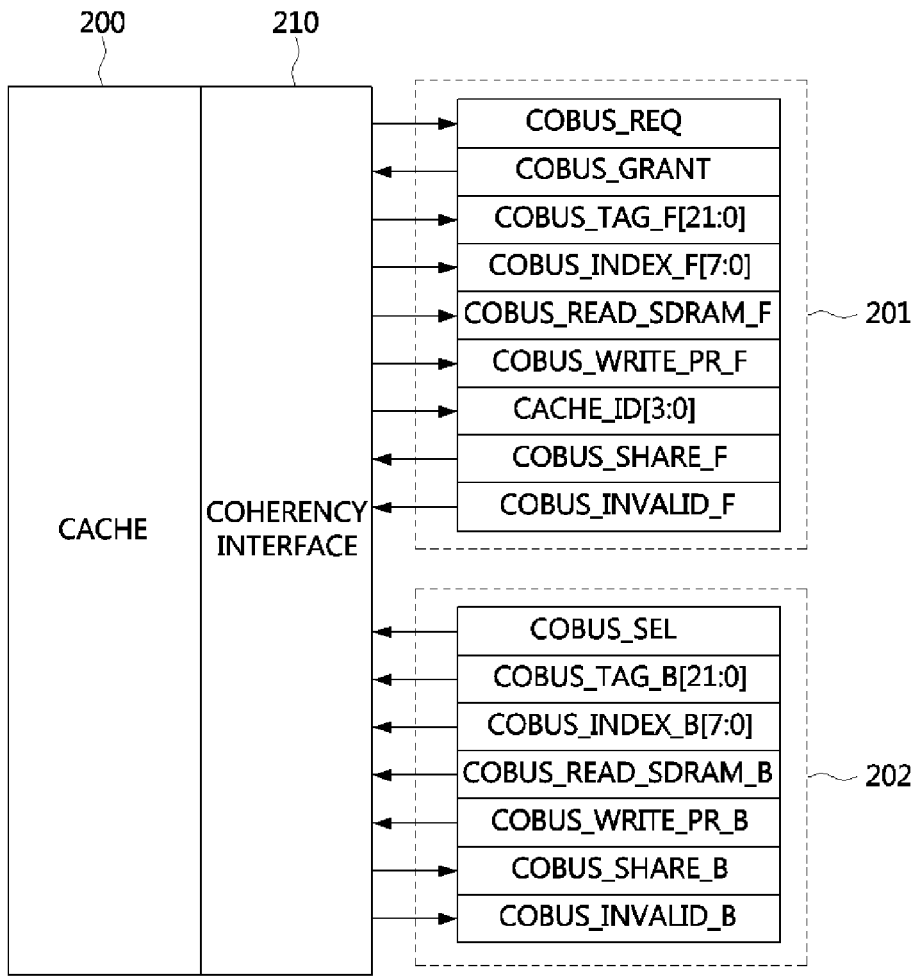
FIG. 2 is a diagram showing input and output of an interface for cache coherency according to an embodiment of the present invention.

FIG. 2 is a diagram showing input and output of an interface for cache coherency according to an embodiment of the present invention.

As shown in FIG. 2, each cache 200 according to an embodiment of the present invention includes a coherency interface 210 for maintaining coherency with other caches.

Transmission and reception information signals of a case in which a corresponding cache receives a cobus_grant signal among input and output signals of the interface 210 for cache coherency are included in an upper end 201, and are displayed as having suffix of "_f".

In addition, transmission and reception information signals of a case in which a corresponding cache receives a cobus_sel signal are included in a lower end 202, and are displayed as having suffix of "_b".

The cache coherency interface 210 exchanges coherency related information signals with at least one another cache memory that is connected to the coherency bus using a coherency bus request signal, a coherency bus occupation permission signal, a main memory read attempting signal, a processor write signal, a coherency bus sharing signal, and a coherency bus invalidation signal.

Representative signals among the input and output signals of the interface for cache coherency shown in FIG. 2 are shown below.

Cobus_request: signal for requesting coherency bus

Cobus_grant: signal for permitting occupation of coherency bus

Figure 3:
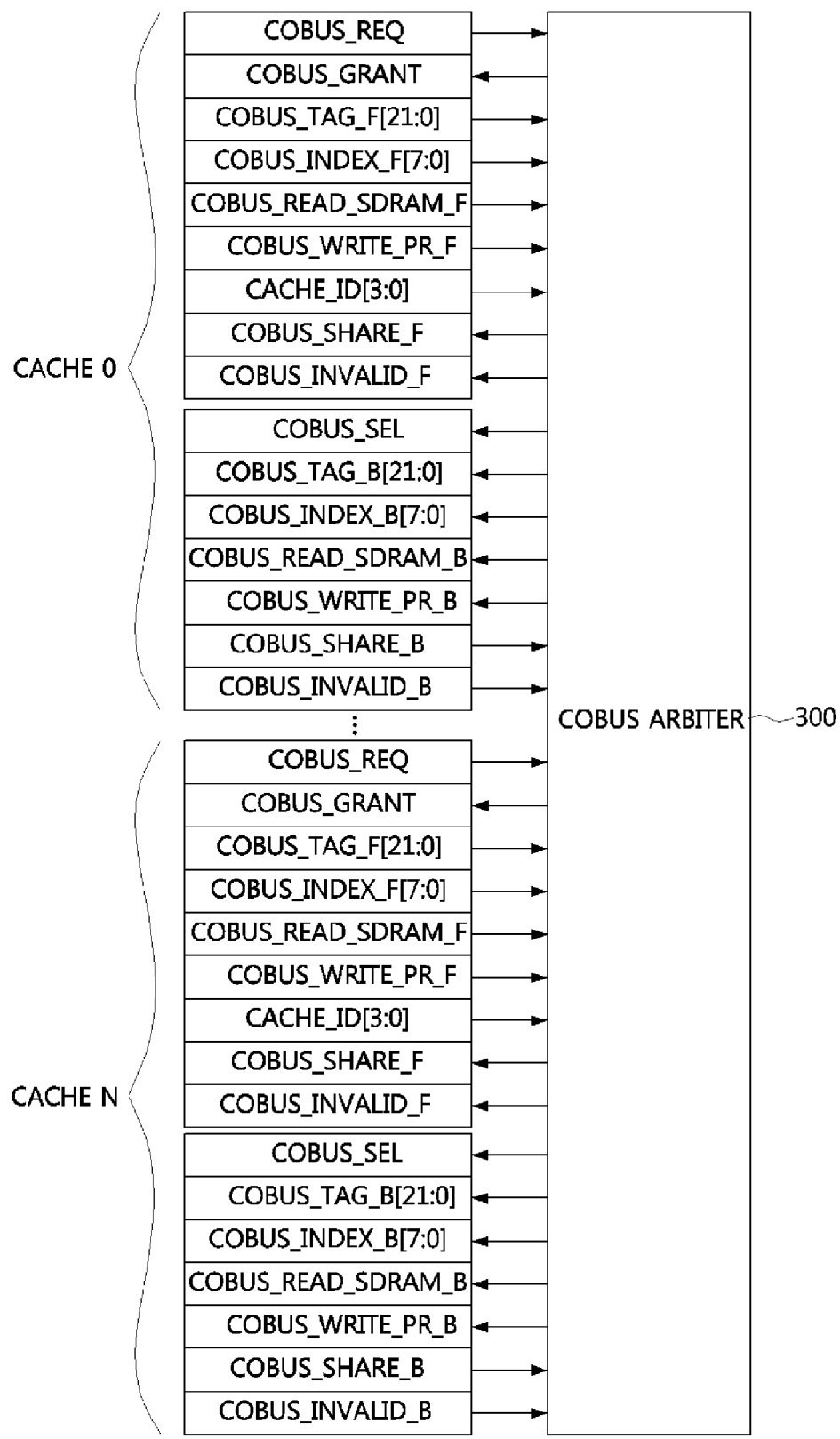
FIG. 3 is a diagram showing input and output of a cobus arbiter according to an embodiment of the present invention.

Cobus_tag[21:0], cobus_index[7:0]: tag and index information of a corresponding address for determining whether information about specific address exists in other caches Cobus_read_Sdram: main memory read attempting signal for notifying reading from main memory (SDRAM) calculated as cobus_tag, cobus_index Cobus_write_Processor: processor write signal for notifying, to cobus_tag, cobus_index, changing to new value by processor Cobus_share: coherency bus sharing signal for notifying that memory value of corresponding tag and index exists in other caches as response from other caches when cobus_read_sdram signal is generated Cobus_invalid: coherency bus invalidation signal for notifying that mode of data existing in cobus_tag, cobus_index is changed to be invalid as response from other caches when cobus_write_processor signal is generated FIG. 3 is a diagram showing input and output of a cobus arbiter according to an embodiment of the present invention.

The cobus arbiter 300 may receive a cobus_req signal from all caches, and transmit a cobus_grant signal for permitting occupation of a coherency bus to a single cache among caches that have requested occupation of the coherency bus. That is, the cobus arbiter 300 permits occupation of the coherency bus only with respect to a specific cache through the cobus_grant signal.

The cobus arbiter 300 may receive a signal from the cache that has received coherency bus occupation permission, and deliver the signal from the cache that has received the coherency bus occupation permission while transmitting a cobus_sel signal to other caches which are determined to have required operations in association with a corresponding signal.

As described above, the information signal transmitted by the cache that has received the cobus_grant signal is displayed as having suffix of "_f", and the information signal received by the cache that has received the cobus_sel signal is displayed as having suffix of "_b", which is likewise applied to FIG. 3.

Meanwhile, the cache that has received the cobus_sel signal may read a signal having suffix of "_b" and transmit a cobus_share_b signal or a cobus_invalid_b signal to the cobus arbiter.

The cobus arbiter may transmit the received signal (cobus_share_b or cobus_invalid_b signal) as a single signal to the cache that has received the cobus_grant signal. That is, when at least one of cobus_share_b signals among signals received from a large number of caches is 1, the cobus arbiter sets a cobus_share_f signal as 1, and when cobus_invalid_b signals are all 1, the cobus arbiter sets a cobus_invalid_f signal as 1 to thereby transmit the corresponding signal to the coherency bus.

The cobus arbiter may receive a signal of each cache, and permits a specific cache to occupy the bus using cobus_req and cobus_grant signals.

Hereinafter, a communication method of the above-described coherency bus interface will be described in detail.

Figure 4:
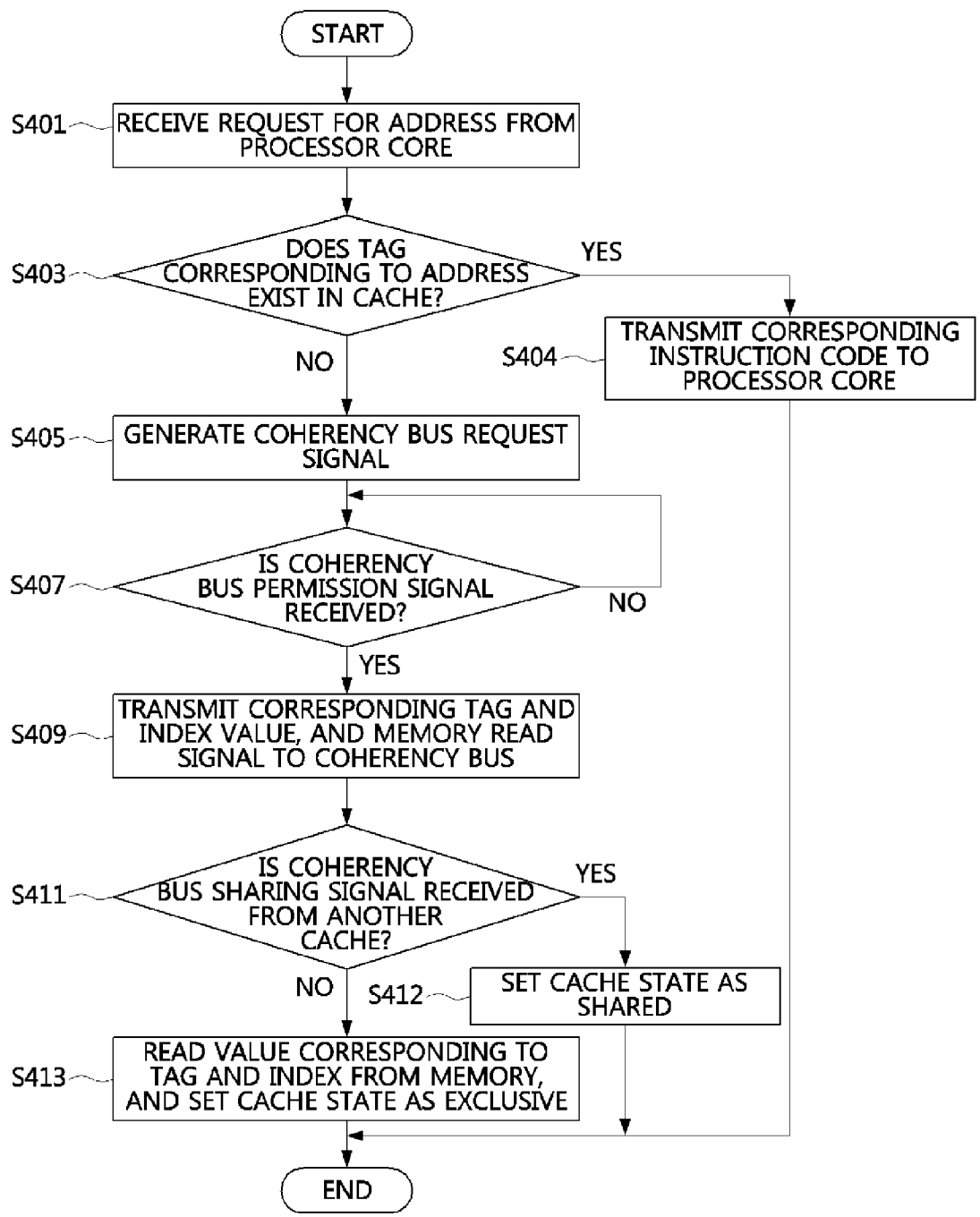
FIG. 4 is an operational flowchart showing a cache for maintaining coherency with other caches according to an embodiment of the present invention.

FIG. 4 is an operational flowchart showing a cache for maintaining coherency with other caches according to an embodiment of the present invention.

First, when a cache receives a data request for a specific address from a processor in step S401, whether a tag corresponding to a corresponding address exists in the cache is determined in step S403.

In step S404, when the corresponding address is an address with respect to data that is already held by the cache, a corresponding instruction code is transmitted to a processor core.

In contrast, when receiving a request for data of a new address that does not exist in the cache, the cache is required to read data stored in the address from a memory.

In this instance, the cache generates a cobus_request signal in step S405, and waits for reception of a cobus_grant signal in step S407.

When receiving the cobus_grant signal, the cache transmits information for cache coherency to the coherency bus. That is, a tag and index value calculated as an address is added to a cobus_tag signal and a cobus_index signal, and a cobus_read_sdram signal is set as 1 so as to display reading from a main memory (SDRAM) to add and transmit the set cobus_read_sdram signal to the coherency bus in step S409.

In this instance, when data corresponding to the cobus_tag signal and the cobus_index signal exists, another cache sets a cobus_share signal as 1, and otherwise, sets the cobus_share signal as 0 to thereby transmit the set cobus_share signal to the cache that has received the cobus_grant signal.

The cache that has received the cobus_grant signal waits for reception of the cobus_share signal from other caches in step S411, stores data read from the main memory in {cobus_tag, cobus_index} when values of the cobus_share signals received from all the other caches are all zero, and sets a cache state as an exclusive mode in step S413.

In contrast, when at least one of the values of the cobus_share signals received from all the other caches is 1, the cache sets the cache state as a shared mode in step S412. When a state of a corresponding cache is in the exclusive mode, another cache that has set the value of the cobus_share signal as 1 also changes the corresponding mode to the shared mode.

As above, the operational flowchart shown in FIG. 4 is merely an embodiment of the present invention, and the scope of the present invention is not limited thereto. In other words, the cache according to the present invention may perform the following various operations.

When a processor changes data of {tag, index} within a cache to a new value, the data of {tag, index} is changed from an invalid/dedicated/shared mode to a modified mode.

When any cache generates a cobus_req signal and receives a cobus_grant signal, a tag and an index are added and transmitted to a cobus_tag signal and a cobus_index signal, and 1 is added and transmitted to a cobus_write_processor signal.

When a cache holding data of {cobus_index, cobus_tag} among caches that have received this signal, a corresponding cache changes and sets a cache state to an invalid mode regardless of a previous mode.

Next, the corresponding cache adds and transmits 1 to a cobus_invalid signal, and allows a cache that has received the cobus_grant signal to be aware of the fact that the corresponding cache has processed corresponding data as invalid.

In a case in which the data of {tag, index} in the cache is shared, a cache state may be changed to an exclusive mode when another cache sharing the data is flushed.

In this manner, a communication structure for independent cache coherency does not allocate a communication bandwidth between a cache and a memory, and therefore has advantages in terms of bandwidth consumption. In addition, a simple communication protocol only for cache coherency is used, and therefore fast communication between caches is also possible.

As above, a communication method according to an embodiment of the present invention that ensures coherency between a large number of dedicated caches has been described.

By adopting the communication method according to an embodiment of the present invention, there is no need to change an on-chip communication structure between an existing cache and a memory for cache coherency.

In addition, a protocol for cache coherency according to an embodiment of the present invention may reduce communication overhead for coherency using a fast handshake.

As described above, according to the present invention, by adding a dedicated channel for coherency to a structure of the cache, a bandwidth shortage phenomenon may be reduced in an on-chip communication structure, which occurs when using a communication structure between a memory and a cache, and communication for coherency between caches may be simplified.

While the example embodiments of the present invention and their advantages have been described in detail, it should be understood that various changes, substitutions, and alterations may be made herein without departing from the scope of the invention.

What is claimed is:

1. A method of maintaining coherency with other plurality of caches through a coherency bus connected to the other plurality of caches, the method comprising:
    determining to hold data corresponding to an address requested from a processor;
    generating a coherency bus request signal on the coherency bus when the data corresponding to the requested address is not held;
    generating information associated with the requested address and a main memory read attempting signal on the coherency bus when receiving a coherency bus occupation permission signal;
    setting a cache state in accordance with a value of a signal received from the other plurality of caches; and
    changing, when another cache sharing corresponding data is flushed while the held data is shared, a state of the corresponding data as 'exclusive',
    wherein a state of the cache memory is managed using a plurality of modes including an exclusive mode, a shared mode, an invalid mode, and a modified mode.

2. The method of claim 1, wherein the information associated with the requested address includes a tag and an index value which are calculated as the address.

3. The method of claim 1, wherein the setting of the cache state in accordance with the value of the signal received from the other plurality of caches includes:
    setting its own state value as 'exclusive' when coherency bus sharing values received from the other plurality of caches are all '0', and
    setting its own state value as 'shared' when at least one of the coherency bus sharing values received from the other plurality of caches is '1'.

4. The method of claim 1, wherein the cache memory exchanges coherency related information signals with at least one another cache memory connected to the coherency bus using at least one of a coherency bus request signal, a coherency bus occupation permission signal, a main memory read attempting signal, a processor write signal, a coherency bus sharing signal, and a coherency bus invalidation signal.

5. The method of claim 1, further comprising changing, when data corresponding to a specific tag and index is changed by the processor, a state of the data corresponding to the tag and index as 'modified'.

6. The method of claim 1, further comprising changing, when holding data corresponding to an index and a tag with respect to a write signal of the coherency bus, a state of the data corresponding to the index and the tag as 'invalid'.

* * * * *